(12) United States Patent
Lu et al.

(10) Patent No.: US 11,675,593 B2
(45) Date of Patent: Jun. 13, 2023

(54) DYNAMICALLY UPDATING A DYNAMIC LIBRARY

(71) Applicant: International Business Machines Corporation, Armonk, NY (US)

(72) Inventors: Jing Lu, Beijing (CN); Dong Hui Liu, Beijing (CN); Xiao Yan Tang, Beijing (CN); Yong Yin, Beijing (CN); Peng Hui Jiang, Beijing (CN); Xiang Zu, BeiJing (CN); Jia Yu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 17/462,071

(22) Filed: Aug. 31, 2021

(65) Prior Publication Data
US 2023/0061270 A1   Mar. 2, 2023

(51) Int. Cl.
G06F 8/65  (2018.01)
G06F 9/38  (2018.01)
G06F 9/34  (2018.01)
G06F 9/54  (2006.01)
G06F 8/656  (2018.01)
G06F 9/445  (2018.01)

(52) U.S. Cl.
CPC .............. *G06F 9/3838* (2013.01); *G06F 8/65* (2013.01); *G06F 8/656* (2018.02); *G06F 9/34* (2013.01); *G06F 9/44521* (2013.01); *G06F 9/541* (2013.01)

(58) Field of Classification Search
CPC ........ G06F 9/3838; G06F 9/34; G06F 9/4452; G06F 9/541; G06F 8/656; G06F 9/44521
USPC ......................................................... 717/164
See application file for complete search history.

(56) References Cited

U.S. PATENT DOCUMENTS

| | | | | |
|---|---|---|---|---|
| 5,949,973 A | * | 9/1999 | Yarom | G06F 9/4486 712/E9.083 |
| 6,442,752 B1 | | 8/2002 | Jennings et al. | |
| 6,665,735 B1 | | 12/2003 | Tanaka et al. | |
| 8,997,074 B1 | | 3/2015 | Chen et al. | |
| 10,007,497 B2 | * | 6/2018 | Eltsin | G06F 8/76 |
| 10,331,824 B2 | * | 6/2019 | Dumont | G06F 30/33 |

(Continued)

FOREIGN PATENT DOCUMENTS

| | | |
|---|---|---|
| CA | 2166302 C | 12/2004 |
| CN | 108427571 A | 8/2018 |

(Continued)

OTHER PUBLICATIONS

Title: On the effectiveness of address-space randomization auhor: ME Segal published on 2004.*

(Continued)

*Primary Examiner* — Chameli Das
(74) *Attorney, Agent, or Firm* — Cantor Colburn LLP; Teddi Maranzano (57) ABSTRACT

Embodiments of the invention are directed to updating a dynamic library. Aspects include receiving an indication that the dynamic library has been updated and identifying all program modules that depend on the dynamic library. Aspects also include, for each program module that depends on the dynamic library, reassigning an application program interface (API) address for a current version of the dynamic library to an API address of the updated version of the dynamic library.

17 Claims, 5 Drawing Sheets

(56) References Cited

U.S. PATENT DOCUMENTS

| | | | | |
|---|---|---|---|---|
| 10,983,803 B2* | 4/2021 | Trent | ......................... | G06F 8/41 |
| 2006/0271925 A1* | 11/2006 | Schuelein | ................. | G06F 8/65 |
| | | | | 717/168 |
| 2010/0192133 A1* | 7/2010 | Brady | ................... | G06F 11/366 |
| | | | | 717/130 |
| 2018/0217851 A1* | 8/2018 | Sirajuddin | .......... | G06F 9/44521 |

FOREIGN PATENT DOCUMENTS

| | | |
|---|---|---|
| CN | 112162790 A | 1/2021 |
| CN | 108762825 B | 4/2021 |
| KR | 102166753 B1 | 10/2020 |

OTHER PUBLICATIONS

Title: Run-time dynamic linking for reprogramming wireless sensor networks, author: A Dunkels, Published on 2006.*
Title: Dynamic software updating, author: M Hicks, Published on 2005.*

* cited by examiner

DYNAMICALLY UPDATING A DYNAMIC LIBRARY

BACKGROUND

The present invention generally relates to updating dynamic library, and more specifically, to dynamically updating a dynamic library.

A dynamic library, also referred to as dynamic link library (DLL), is a library containing code and data that can be used by multiple programs at the same time and is not an executable file. Dynamic linking provides a way for a process to call functions that do not belong to its executable code. The executable code for the functions is located in a DLL that contains one or more functions that have been compiled, linked and stored separately from the process in which they are used. DLLs also facilitate sharing of data and resources. Multiple applications can simultaneously access the contents of a single DLL copy in memory. A DLL is a library that contains code and data that can be used by multiple programs simultaneously. During runtime, when a program is invoked that utilizes a dynamic library, the dynamic library is loaded into the memory by the system. The advantage of using dynamic libraries is that the system only needs to load the dynamic library once and multiple programs can obtain copies of the same dynamic library in the memory.

Currently, after a dynamic library is updated, the running process of the application must be terminated and restarted to use the updated library because the current dynamic linker and loader can not resolve the function and variable address of updated library for the running process, especially when the dynamic libraries have dependencies with other dynamic libraries.

SUMMARY

Embodiments of the present invention are directed to a computer-implemented method for updating a dynamic library. A non-limiting example of the computer-implemented method includes receiving an indication that the dynamic library has been updated and identifying all program modules that depend on the dynamic library. The method also includes, for each program module that depends on the dynamic library, reassigning an application program interface (API) address for a current version of the dynamic library to an API address of the updated version of the dynamic library.

Embodiments of the present invention are directed to a system for updating a dynamic library. A non-limiting example of the system includes a processor communicative coupled to a memory, the processor operable to receive an indication that the dynamic library has been updated and identify all program modules that depend on the dynamic library. The processor further operable to, for each program module that depends on the dynamic library, reassign an application program interface (API) address for a current version of the dynamic library to an API address of the updated version of the dynamic library.

Embodiments of the invention are directed to a computer program product for updating a dynamic library, the computer program product comprising a computer readable storage medium having program instructions embodied therewith. The program instructions are executable by a processor to cause the processor to receive an indication that the dynamic library has been updated and identify all program modules that depend on the dynamic library. The processor further operable to, for each program module that depends on the dynamic library, reassign an application program interface (API) address for a current version of the dynamic library to an API address of the updated version of the dynamic library.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As discussed above, the current process for updating a dynamic library requires that all applications that use the dynamic library be terminated and restarted. In exemplary embodiments, methods, systems, and computer program products are provided which enable a dynamic library to by updated and reloaded without requiring a restart of the running applications that depend on the updated dynamic libraries, The methods, systems, and computer program products are configured to dynamically identify the calling relationship between applications and dynamic libraries and to re-assign an application program interface address of the dynamic libraries for all running processes which rely on to the dynamic libraries. As a result, developers can improve the availability of applications even in a frequently changing system environment.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Figure 1:
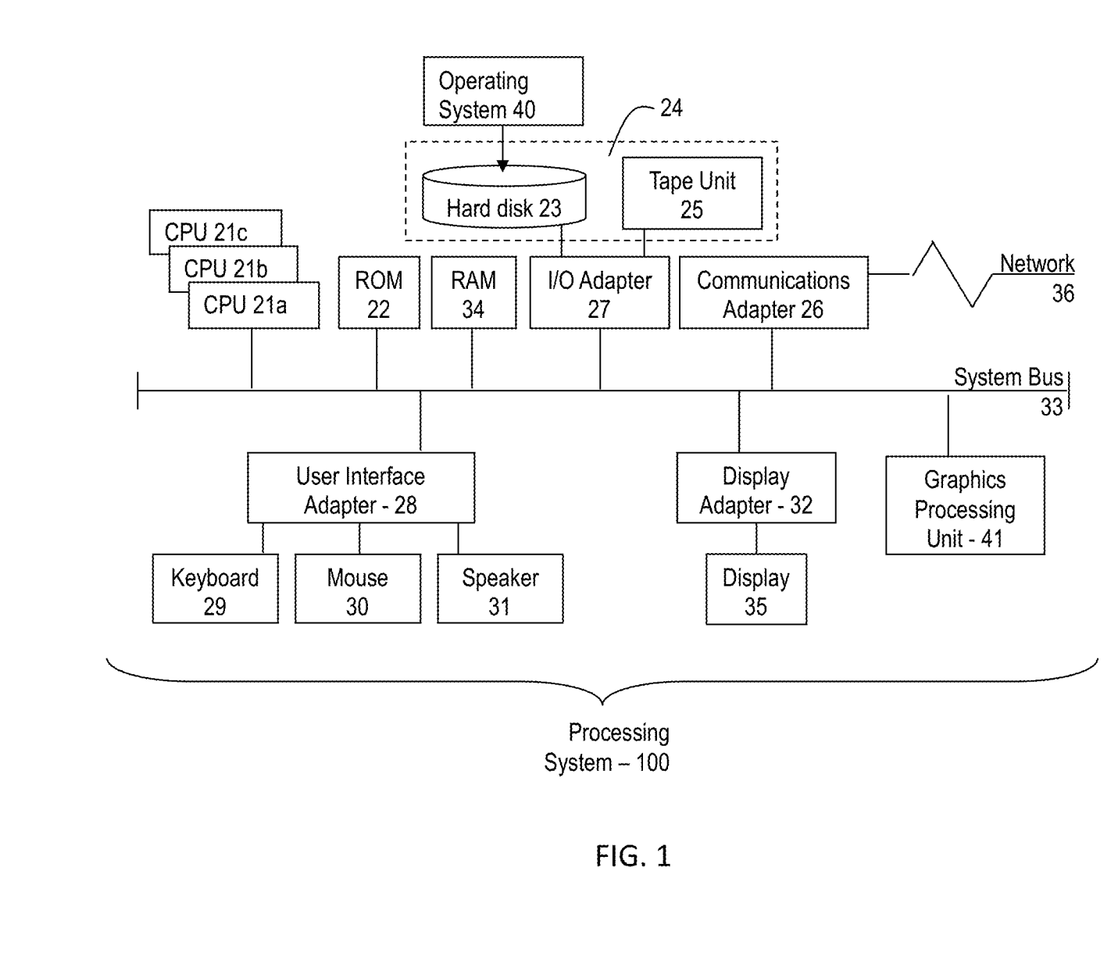
FIG. 1 depicts a block diagram of a computer system for use in implementing one or more embodiments of the invention.

Referring to FIG. 1, there is shown an embodiment of a processing system 100 for implementing the teachings herein. In this embodiment, the system 100 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 100.

FIG. 1 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 100 may be stored in mass storage 24. A network adapter 26 interconnects bus 33 with an outside network 36 enabling data processing system 100 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 100 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 1, the system 100 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system to coordinate the functions of the various components shown in FIG. 1.

Turning now to a more detailed description of aspects of the present invention, methods, systems, and computer program products for dynamically updating a dynamic library, or DLL, are provided. In exemplary embodiments, the methods, systems, and computer program products for dynamically updating a DLL enable DLLs to be updated without restarting the running applications that depend on the updated DLLs. In exemplary embodiments, the calling relationships between applications and DLLs are tracked during runtime and a DLL dynamic reloading signal is used to initiate a dynamic update to a new version of an existing DLL. The dynamic update of the DLL includes re-assigning the DLL addresses for all running processes which are using the DLL.

In exemplary embodiments, a DLL dependency table is used to store calling relationships between applications and DLLs. During the application runtime when a runtime environment resolves a DLL, if the runtime environment detects that a program referenced the DLL the DLL dependency table is updated to record the program and DLLs dependency relationship for either explicit DLL referencing or implicit DLL referencing. In addition, since a DLL can call another DLL, a DLL ancestor table is also updated to record the dependency relationships among different DLLs. In exemplary embodiments, the dependency relationship between DLLS can be complex and the DLL ancestor table can be stored as directed graph.

Figure 2:
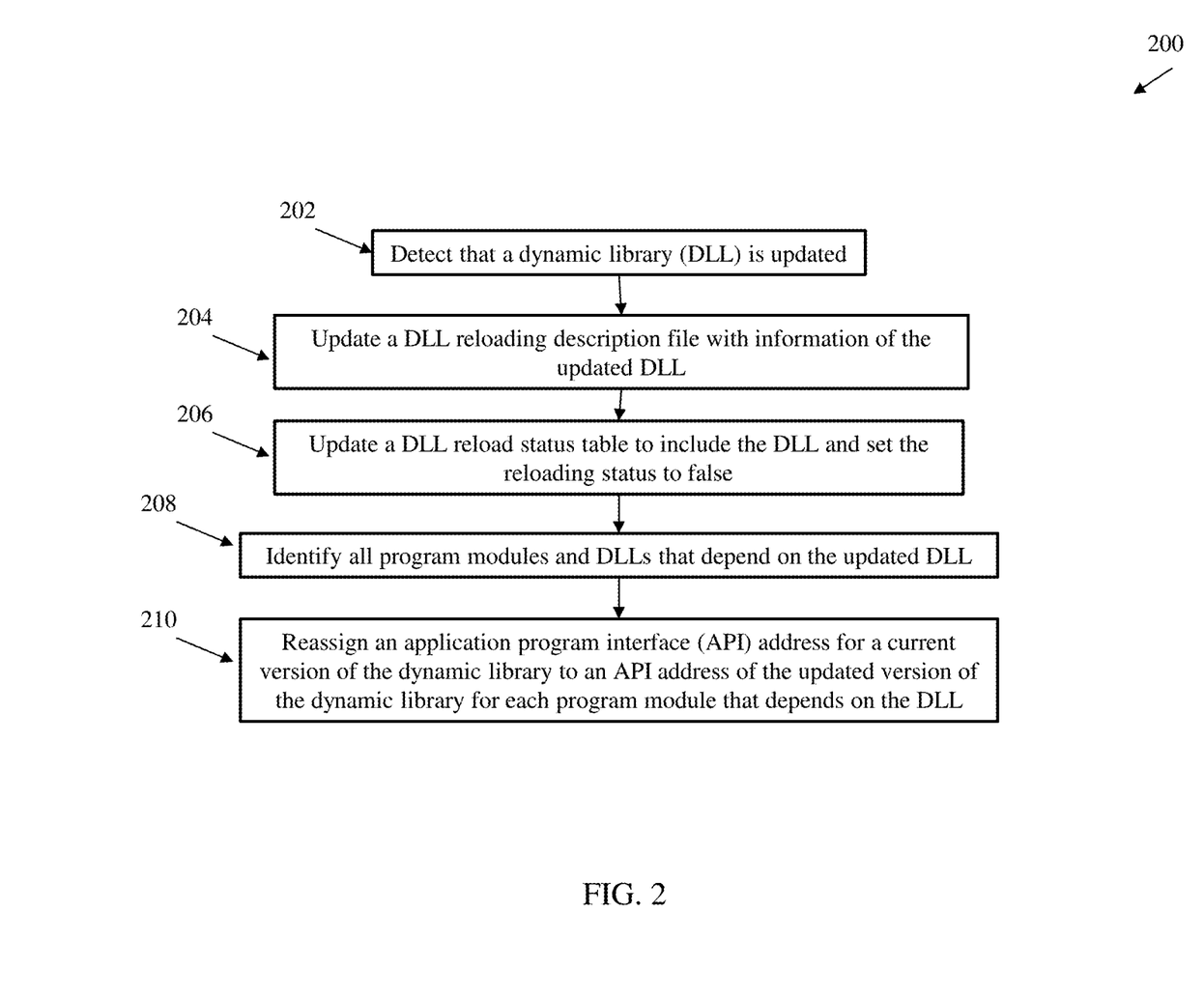
FIG. 2 depicts a flow diagram of a method for updating a dynamic library according to one or more embodiments of the invention.

Referring now to FIG. 2, a flow diagram of a method 200 for dynamically updating a dynamic library according to one or more embodiments of the invention is shown. The method 200 can be executed on the processing system 100 found in FIG. 1 or on any other suitable processing system. As shown at block 202, the method 200 begins by detecting that a dynamic library (DLL) has been updated. Next, as shown at block 204, the method 200 includes updating a DLL reloading description file with information of the updated DLL. In exemplary embodiments, the information of the updated DLL includes a directory and name of the updated DLL. The method 200 also includes updating a DLL reload status table to include the DLL and set the reloading status to false, as shown at block 206. Next, as shown at block 208, the method 200 includes identifying all program modules and DLLs that depend on the updated DLL. In exemplary embodiments, a dynamic library dependency table is maintained to track dynamic libraries used by each running process and identifying all program modules that depend on the dynamic library includes looking up the dynamic liberty in the dynamic library dependency table. The method 200 also includes reassigning an application program interface (API) address for a current version of the dynamic library to an API address of the updated version of the dynamic library for each program module that depends on the DLL, as shown at block 210.

In exemplary embodiments, the method also includes obtaining an import table of the updated version of the dynamic library, the import table including a function list and a variable list. Once the import table is obtained, a function entry point address for each function on the function list and a variable address for each variable on the variable list are re-calculated based on the beginning address of the updated version of the dynamic library. Then the function list and a variable list of the import table are updated based on the re-calculated addresses.

In exemplary embodiments, based on a determination that the import table includes one or more dynamic libraries that depend from the dynamic library, the method includes checking a reload status of the one or more dynamic libraries in a dynamic library status table. Based on a determination that the reload status of at least one of the one or more dynamic libraries in the dynamic library reload status table is false, the method also includes initiating a reloading of the dynamic libraries having a false reload status.

Figure 3:
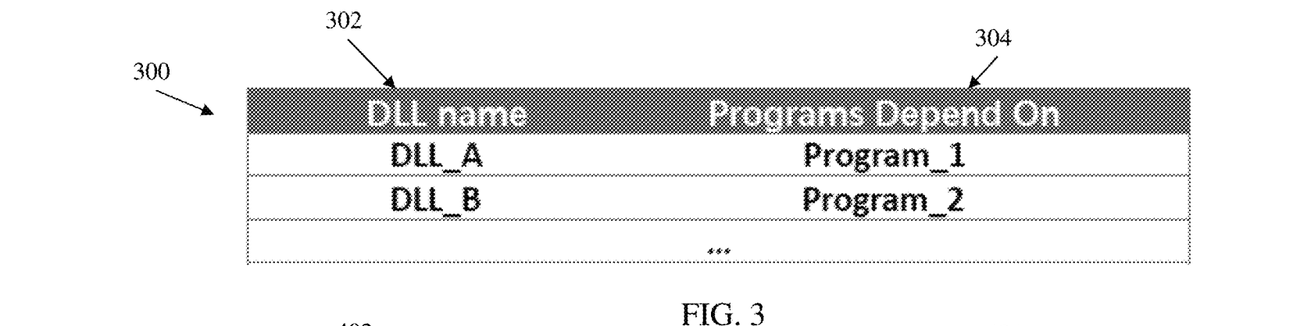
FIG. 3 depicts an illustration of a dynamic library dependency table according to one or more embodiments of the invention.

FIG. 3 depicts an illustration of a dynamic library dependency table 300 according to one or more embodiments of the invention. As illustrated, the dynamic library dependency table 300 includes a list of names of dynamic libraries 302 and an indication of programs 304 that depend on each dynamic library 302.

Figure 4:
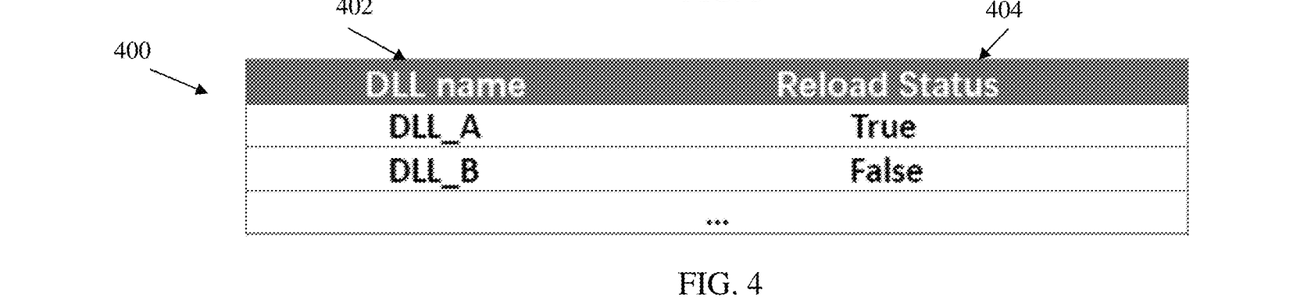
FIG. 4 depicts an illustration of a dynamic library reload status table according to one or more embodiments of the invention.

FIG. 4 depicts an illustration of a dynamic library reload status table 400 according to one or more embodiments of the invention. As illustrated, the dynamic library reload status table 400 includes a list names of dynamic libraries 402 and an reload status 404 of each dynamic library 402. In exemplary embodiments, the reload status 404 is one of true or false. A reload status 404 of false indicates the dynamic library 402 is currently being updated and therefore the DLL should not be reloaded and a reload status of true indicates that the DLL can be reloaded.

Figure 5:
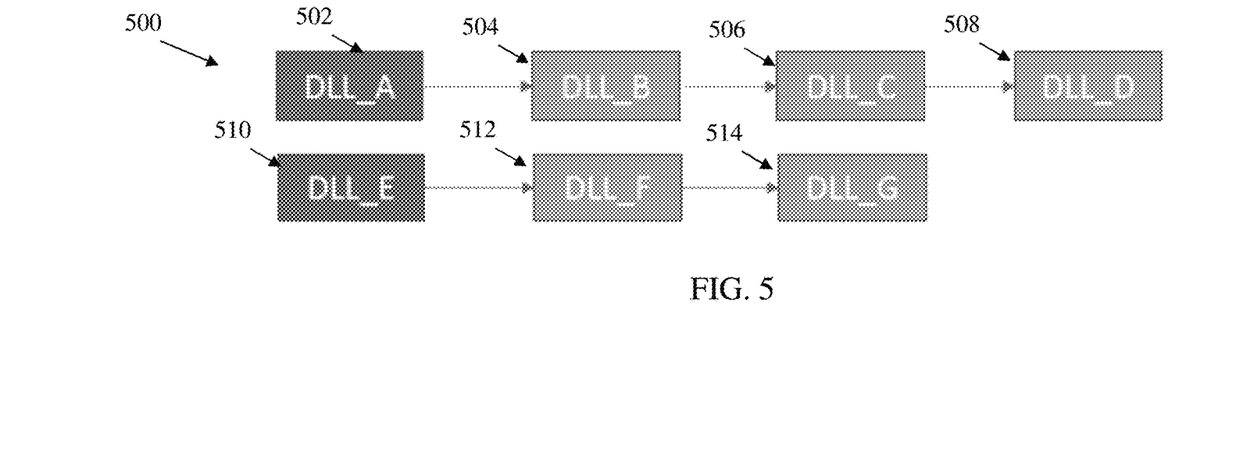
FIG. 5 depicts an illustration of a dynamic library ancestry table according to one or more embodiments of the invention.

FIG. 5 depicts an illustration of a dynamic library ancestry table 500 according to one or more embodiments of the invention. In one embodiment, the dynamic library ancestry table 500 is stored as a series of directed graphs, where each directed graph is used to store dependency relationships among dynamic libraries. As illustrated, DLL_D 508 depends from DLL_C 506, which depends from DLL_B 504, which depends from DLL A 502. In additions, DLL G 514 depends from DLL F 512, which depends from DLL_E 510. Although relatively simple dependencies are shown, the dependencies relationships among DLLs can be very complex.

In exemplary embodiments, a DLL dynamic reload routine is used to dynamically update an existing DLL with an updated DLL. The DLL dynamic reload routine beings by identifying all program module that depend on the DLL by checking the DLL dependency table. Next, the DLL dynamic reload routine reloads the updated DLL and obtains the beginning address of the updated DLL. After obtaining the beginning address of the updated DLL, the DLL dynamic reload routine calls a DLL resolve routine for each program module identified.

The DLL resolve routine checks the import function list and import variable list in the DLL entry list of the updated DLL in the import table and re-calculates the function entry point address and variable address based on the beginning address of the new version of the updated DLL. Next, the DLL resolve routine updates the corresponding record of the function entry point address and variable address of the updated DLL in the writable static area of the DLL which depends on the updated DLL to contain the function entry point address and variable address of the new version of the updated DLL.

Figure 6:
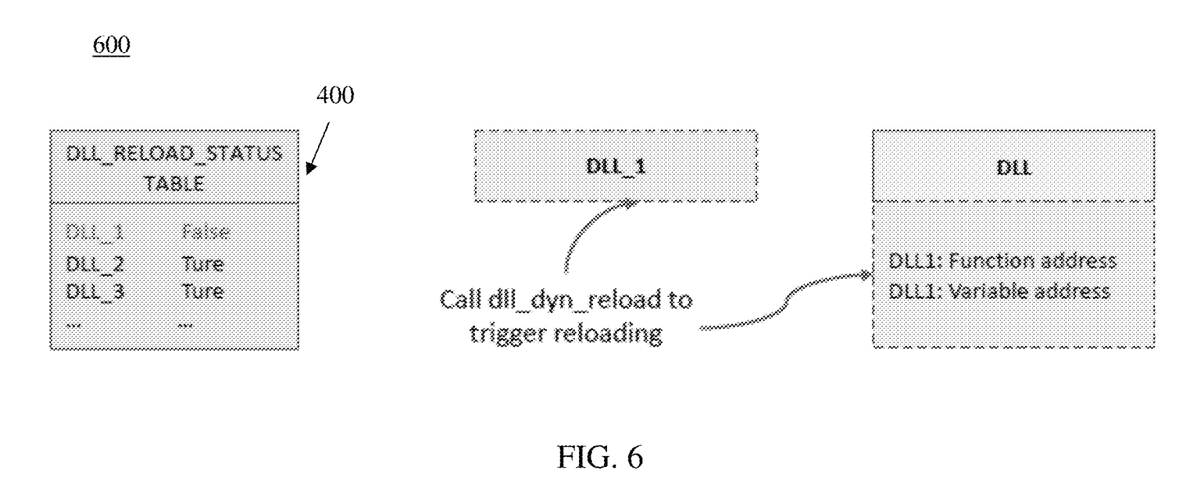
FIG. 6 depicts an illustration of updating a dynamic library which has a reload status of false in the dynamic library reload status table according to one or more embodiments of the invention.
Figure 7:
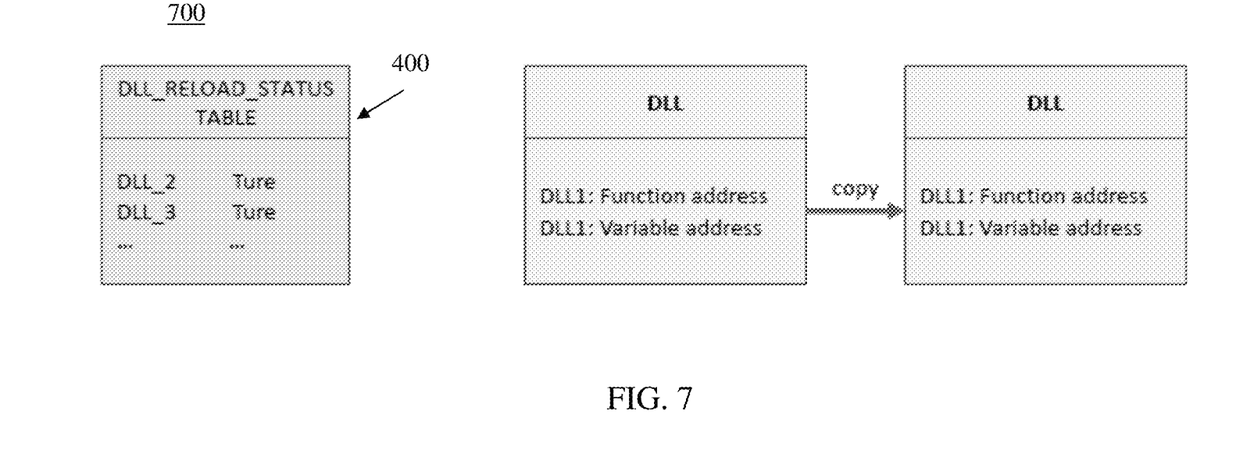
FIG. 7 depicts an illustration of updating a dynamic library which is not listed in the dynamic library reload status table according to one or more embodiments of the invention.
Figure 8:
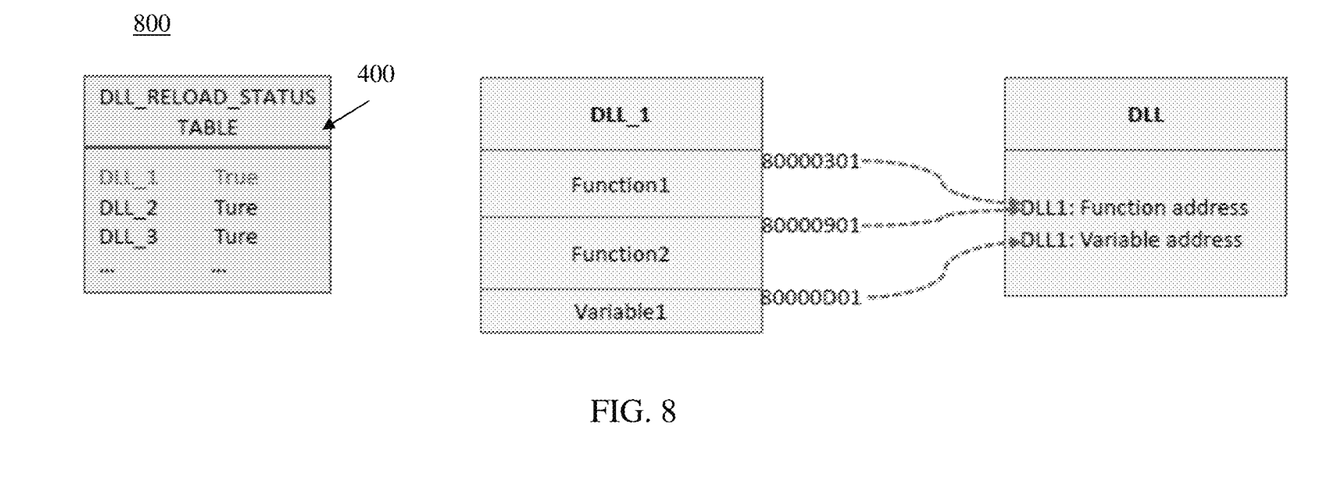
FIG. 8 depicts an illustration of updating a dynamic library which has a reload status of true in the dynamic library reload status table according to one or more embodiments of the invention.

In exemplary embodiments, the DLL resolve routine is further configured to check the DLL dependency table for any DLLs in the import table of the updated DLL. If the import table of the updated DLL includes a DLL that is in the DLL dependency table which as a reload status of false, the DLL resolve routine calls the DLL dynamic reload routine to trigger reloading the identified DLL, as illustrated in FIG. 6. If the DLL in the import table is not in the DLL dependency table, the DLL resolve routine copies the imported function entry point address and variable address from the old version of the updated DLL into the corresponding record of the function entry point address and variable address in the writable static area of the new version of the updated DLL, as illustrated in FIG. 7. If the import table of the updated DLL includes a DLL that is in the DLL dependency table which as a reload status of true, the DLL resolve routine re-calculate the function entry point address and variable address based on the beginning address of the DLL and updates the corresponding record in the writable static area of the new version of the updated DLL, as illustrated in FIG. 8.

In exemplary embodiments, an update of multiple DLLs are triggered to be updated at the same time. In these embodiments, a multiple DLL dynamic reload routine is configured to identify the DLLs to be updated and to identify each DLL that depends, both directly and indirectly, on the DLLS to be updated, which are referred to as ancestor DLLs. In exemplary embodiments, the multiple DLL dynamic reload routine identities the ancestor DLLs based on the dynamic library ancestry table 500. Next, the multiple DLL dynamic reload routine calls the DLL dynamic reload routine for each ancestor DLL.

Technical benefits of dynamically updating a dynamic library include the ability to update a dynamic library without requiring halting execution of program modules that depend on the dynamic library. As a result, the time and effort required for application programmers during developing or root cause locating is reduced. Further, the methods, systems and computer program products for dynamically updating a dynamic library provide users a more flexibility in testing or debugging dynamic libraries. In addition, developers can improve the availability of applications even in a frequently changing system environment.

Additional processes may also be included. It should be understood that the process depicted in FIG. 2 represents an illustration and that other processes may be added, or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for updating a dynamic library, the method comprising:
   receiving an indication that the dynamic library has been updated;
   identifying all program modules that depend on the dynamic library; and
   for each program module that depends on the dynamic library:
      reassigning an application program interface (API) address for a current version of the dynamic library to an API address of the updated version of the dynamic library;
      obtaining an import table of the updated version of the dynamic library, the import table including a function list and a variable list;
      re-calculating a function entry point address for each function on the function list based on a beginning address of the updated version of the dynamic library;
      re-calculating a variable address for each variable on the variable list based on the beginning address of the updated version of the dynamic library; and
      updating the function list and a variable list based on the re-calculated addresses.

2. The method of claim 1, further comprising:
   maintaining a dynamic library dependency table to track dynamic libraries used by each running process,
   wherein identifying all program modules that depend on the dynamic library includes looking up the dynamic library in the dynamic library dependency table.

3. The method of claim 1, further comprising:
   maintaining a dynamic library ancestor table to track dependences among dynamic libraries; and
   identifying all dynamic libraries that depend on the dynamic library.

4. The method of claim 1, further comprising triggering an update of the identified dynamic libraries that depend on the dynamic library.

5. The method of claim 1, further comprising:
   maintaining a dynamic library status table to track a reload status of all dynamic libraries; and
   updating, in response to the indication, the reload status of the dynamic library to false.

6. The method of claim 1, further comprising:
   based on a determination that the import table includes one or more dynamic libraries that depend from the dynamic library, checking a reload status of the one or more dynamic libraries in a dynamic library status table; and
   based on a determination that the reload status of at least one of the one or more dynamic libraries in the dynamic library status table is false, initiating a reloading of the dynamic libraries having a false reload status.

7. A system for updating a dynamic library, the system comprising:
   a processor communicatively coupled to a memory, the processor configured to:
      receive an indication that the dynamic library has been updated;
      identify all program modules that depend on the dynamic library; and
      for each program module that depends on the dynamic library:
         reassign an application program interface (API) address for a current version of the dynamic library to an API address of the updated version of the dynamic library;
         obtain an import table of the updated version of the dynamic library, the import table including a function list and a variable list;
         re-calculate a function entry point address for each function on the function list based on a beginning address of the updated version of the dynamic library;
         re-calculate a variable address for each variable on the variable list based on the beginning address of the updated version of the dynamic library; and
         update the function list and a variable list based on the re-calculated addresses.

8. The system of claim 7, wherein the processor is further configured to:
   maintain a dynamic library dependency table to track dynamic libraries used by each running process,
   wherein identifying all program modules that depend on the dynamic library includes looking up the dynamic library in the dynamic library dependency table.

9. The system of claim 7, wherein the processor is further configured to:
   maintain a dynamic library ancestor table to track dependences among dynamic libraries; and
   identify all dynamic libraries that depend on the dynamic library.

10. The system of claim 7, wherein the processor is further configured to trigger an update of the identified dynamic libraries that depend on the dynamic library.

11. The system of claim 7, wherein the processor is further configured to:
    maintain a dynamic library status table to track a reload status of all dynamic libraries; and update, in response to the indication, the reload status of the dynamic library to false.

12. The system of claim 7, wherein the processor is further configured to:

based on a determination that the import table includes one or more dynamic libraries that depend from the dynamic library, check a reload status of the one or more dynamic libraries in a dynamic library status table; and based on a determination that the reload status of at least one of the one or more dynamic libraries in the dynamic library status table is false, initiate a reloading of the dynamic libraries having a false reload status.

13. A computer program product for updating a dynamic library comprising a computer readable storage medium having program instructions embodied therewith, the program instructions executable by a processor to cause the processor to:

receive an indication that the dynamic library has been updated;

identify all program modules that depend on the dynamic library; and for each program module that depends on the dynamic library:

reassign an application program interface (API) address for a current version of the dynamic library to an API address of the updated version of the dynamic library;

obtain an import table of the updated version of the dynamic library, the import table including a function list and a variable list;

re-calculate a function entry point address for each function on the function list based on a beginning address of the updated version of the dynamic library;

re-calculate a variable address for each variable on the variable list based on the beginning address of the updated version of the dynamic library; and update the function list and a variable list based on the re-calculated addresses.

14. The computer program product of claim 13, wherein the processor is further configured to:

maintain a dynamic library dependency table to track dynamic libraries used by each running process, wherein identifying all program modules that depend on the dynamic library includes looking up the dynamic library in the dynamic library dependency table.

15. The computer program product of claim 13, wherein the processor is further configured to:

maintain a dynamic library ancestor table to track dependences among dynamic libraries; and identify all dynamic libraries that depend on the dynamic library.

16. The computer program product of claim 13, wherein the processor is further configured to trigger an update of the identified dynamic libraries that depend on the dynamic library.

17. The computer program product of claim 13, wherein the processor is further configured to:

maintain a dynamic library status table to track a reload status of all dynamic libraries; and update, in response to the indication, the reload status of the dynamic library to false.

* * * * *